United States Patent Office 2,884,588
Patented Apr. 28, 1959

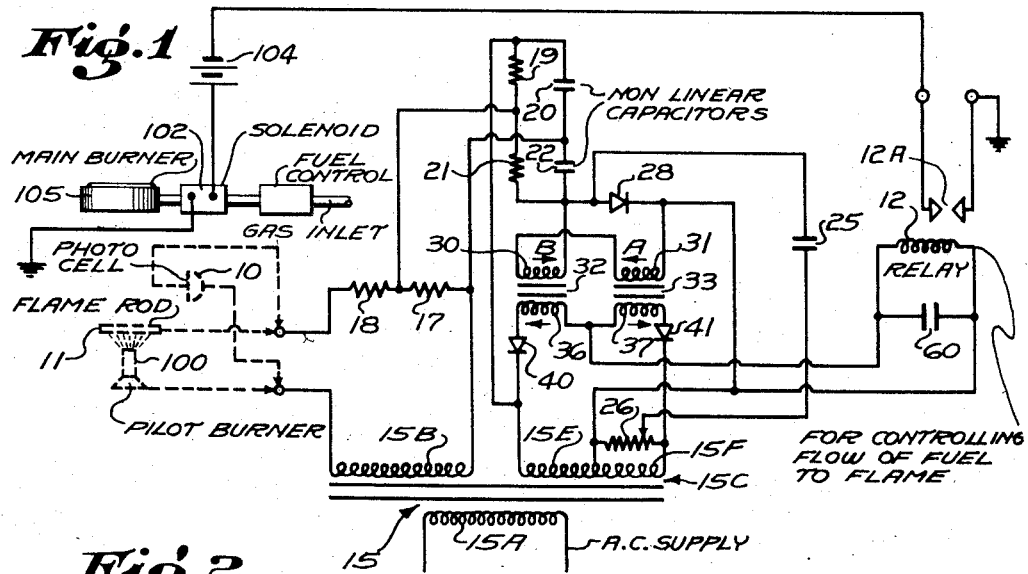
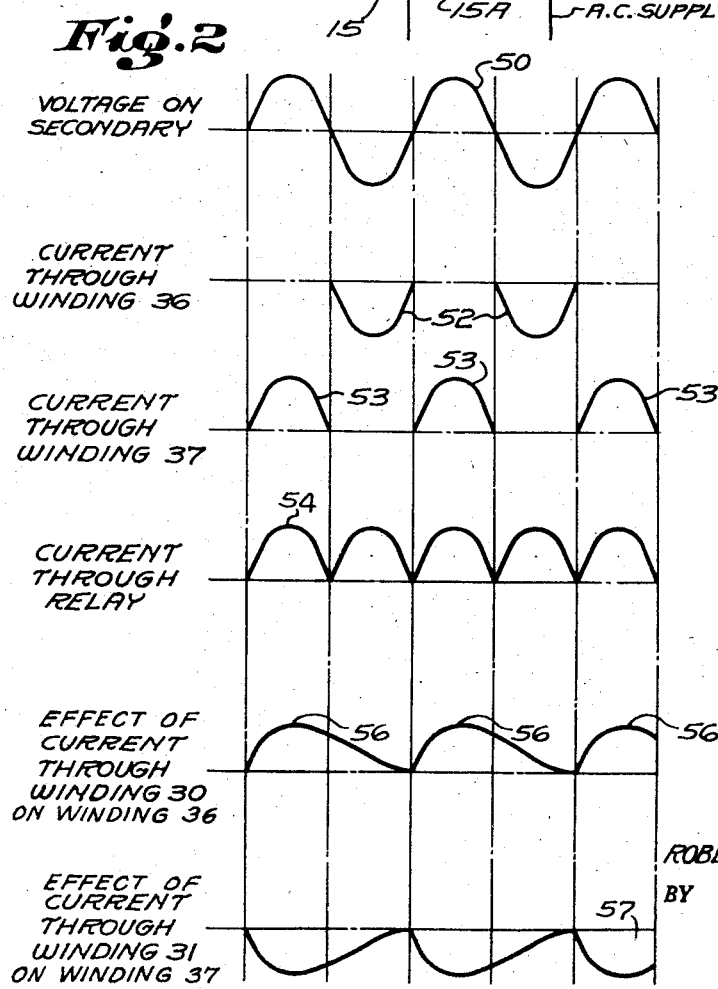

2,884,588
ELECTROSTATIC MAGNETIC AMPLIFIER FOR COMBUSTION CONTROL AND OTHER PURPOSES

Robert Leroy Peterson, North Hollywood, Calif., assignor to General Controls Co., Glendale, Calif., a corporation of California Application January 26, 1953, Serial No. 333,194

2 Claims. (Cl. 323—89)

The present invention relates to a control system in which a nonlinear dielectric is used such that, when a potential is applied to the capacitor having the dielectric, the capacitance of the capacitor changes, i.e., decreases; and, more specifically, relates to a nonlinear condenser of this character which controls a magnetic amplifier, the magnetic amplifier, in turn, controlling the energization of a load, for example, a relay winding.

In general, the present invention involves the use of nonlinear capacitors to which is applied a voltage developed by, for example, the energization of a flame rod or photo cell. The capacitors, in turn, are connected in a bridge circuit containing, in one arm thereof, such nonlinear capacitors; in a second arm thereof, a linear capacitor; in a third and fourth arm, the two halves respectively of a center-tapped transformer secondary winding. Such bridge circuit is normally maintained in an unbalanced condition so that a current, i.e., an unbalanced current, flows in the output circuit of the bridge which comprises a rectifier and a control winding of each of a pair of saturable reactors. The unbalanced current as rectified by such rectifier serves to bias the saturable reactors such that normally the reactors each have a high impedance preventing full energization of a relay winding coupled to such reactors. When the flame rod or photo cell is energized, the voltage developed thereby is applied to the nonlinear capacitors or condensers so that the normally unbalanced bridge circuit tends to become balanced, thereby reducing the unbalanced current in the output circuit and relieving the bias on the saturable reactors, to reduce their impedance and consequently allow the relay winding to become fully energized.

It is therefore a general object of the present invention to provide an improved system in which the aforementioned functions, operation and results may be achieved.

A specific object of the present invention is to provide an improved control system of this character which is suitable for controlling loads, such as relay windings, in accordance with relatively small currents developed by flame rods, photo cells and the like.

Another specific object of the present invention is to provide an improved system of this character in which the amplification is relatively high even though no amplifying tubes are required.

Another specific object of the present invention is to provide an improved control system of this character which requires for its operation only an external commercially available alternating current supply.

Another specific object of the present invention is to provide an improved system of this character in which the circuit parameters are stable, thereby affording stable and foolproof operation over a long period of time.

Another specific object of the present invention is to provide an improved system of this character which requires a relatively small amount of power, particularly in standby operation.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a schematic circuit diagram illustrating apparatus embodying features of the present invention for achieving the functions, operation and results of the present invention; and Figure 2 is a graphical representation illustrating various voltages and currents in the circuit of Figure 1 to facilitate the description of the same, it being noted that the currents and voltages in such Figure 2 are represented qualitatively only and not necessarily quantitatively.

Referring to Figure 1, the input signal to the amplifier circuit shown therein may be in the order of a few microamperes developed using either the photo cell 10 or the flame rod 11 for controlling the operation of the relay winding 12. It is understood that such relay winding 12 is representative of other types of loads which may be used; such other loads may be, for example, a solenoid, a heating element, a motor and the like. The apparatus is energized with alternating current, commercially available, and applied to the primary winding 15A of the transformer 15, such transformer having the secondary winding 15B and the center-tapped secondary winding 15C. For convenience of reference, one half of the winding 15C is designated by the reference numeral 15E, while the other half is represented by the reference numeral 15F.

The secondary winding 15B is serially connected with resistances 17 and 18, and the photo cell 10. Also a flame rod 11 may be connected in parallel with or instead of the photo cell 10 to produce the same effect on the control circuit as the photo cell 10. Both the photo cell 10 and the flame rod 11, of course, are unidirectional conducting devices so that a pulsating or unidirectional voltage is developed across the terminals of resistance 17. One terminal of resistance 17 is connected to one terminal of condenser 20 through resistance 19, and to one terminal of condenser 22 through resistance 21, the other terminal of condensers 20 and 22 being interconnected and connected to the other terminal of resistance 17 so that the unidirectional pulsating voltage developed across resistance 17 is applied to the condensers 20 and 22. Even though the voltage developed across resistance 17 has an alternating current component, only a very small portion of this alternating current component appears across condensers 20 and 22 because the alternating current impedance of such condensers 20 and 22 is much smaller than the magnitude of resistances 18, 19 and 21.

In other words, the impedance of resistance 19 is large in comparison to the impedance of condenser 20 and the impedance of resistance 21 is large in comparison with the impedance of condenser 22, and since a voltage applied to a series circuit is distributed across elements thereof in accordance with the ratio of the impedance of a particular element to the impedance of the series circuit, a much greater alternating current voltage derived from winding 15B, appears across resistances 19 and 21 than across corresponding condensers 20 and 22. However, since the condensers 20 and 22 have, of course, a very high impedance with respect to the unidirectional component of voltage developed, using the flame rod 11, a relative large proportion of such unidirectional component appears across condensers 20 and 22. Thus, by these means discrimination is obtained between the A.C. and D.C. components of the signal derived from the flame rod. This discrimination does not depend on the non-linear characteristic of the condensers.

In accordance with one important feature of the present invention, the condensers 20 and 22 contain a non-linear dielectric, such as barium titanate. Thus, when a potential is applied to the capacitors 20, 22, the magnitude of their capacitance decreases. In this manner, the magnitude of the capacitance of capacitors 20 and 22 is controlled either by the flame rod 11 or the photo cell 10.

The condensers 20 and 22 are connected in a four-arm bridge, such capacitors 20 and 22 being connected with resistances 19 and 21 in a first arm of the bridge, the linaer capacitor 25 being connected in a second arm of the bridge, the third arm of the bridge comprises the transformer winding half 15E, and the fourth arm of such bridge comprises the other secondary winding half 15F which has connected in shunt therewith the potentiometer resistance 26 having its adjustable tap connected to one terminal of condenser 25. The output circuit of such bridge comprises the rectifier 28 which is shunted by the serially connected saturable reactor control windings 30 and 31 respectively of the saturable reactors 32 and 33.

The aforementioned bridge circuit is normally unbalanced in accordance with the adjustment of the tap on resistance 26.

The extent to which the aforementioned bridge is unbalanced is such that the impedance of windings 36 and 37 each is sufficiently high so that the relay 12 is not normally fully energized.

It is noted that the relay winding 12 has one of its terminals connected to the junction point of windings 36 and 37, the other terminal of relay winding 12 being connected to the center tap on the secondary winding 15C. One outside terminal of winding 15C is connected through rectifier 40 to one terminal of winding 36, while the other outside terminal of winding 15C is connected through rectifier 41 to one terminal of the winding 37.

Referring to Figure 2, the alternating voltage induced into the secondary winding 15C by the primary winding 15A is represented by the alternating sine wave 50. The rectifiers 40 and 41 in Figure 1 are so poled that the current variations through windings 36 and 37, respectively, are represented by the half-wave pulses 52 and 53, respectively. These half-wave pulses 52 and 53 are combined in the common leg which includes the relay winding 12, and the current through the relay winding 12 is represented by the pulsating waveform 54 which is a full wave.

The rectifier 28 is so poled in Figure 1 that the effect of current flow through the serially connected control windings 30 and 31 on windings 36 and 37 respectively is represented by the half-wave pulses 56 and 57, respectively. In this regard it is noted that although the windings 30 and 31 are serially connected they are connected with opposite polarities to have opposite effects on the associated windings 36 and 37.

It is observed that the magnetic effect of the half-wave pulses 56 is in opposition to the magnetic effect produced by current flow through winding 36; likewise, the magnetic effect produced by current flowing through winding 31 is in opposition to the magnetic effect produced by current flowing through the winding 37. In this sense, the unbalanced current flowing through windings 30 and 31 biases the saturable reactors 32 and 33 to such an extent that the impedance of the windings 36 and 37 each is relatively high preventing full energization of the relay winding 12 with alternating current.

However, when the photo cell 10 or flame rod 11 is energized, the unidirectional voltage across resistance 17 is increased and such increased voltage across resistance 17 has the effect of reducing the magnitude of the capacitance of capacitors 20, 22, thereby causing the aforementioned bridge circuit to assume a more balanced condition, reducing the current flow through the output circuit which includes the windings 30 and 31, to in turn allow the impedance of the reactor windings 36, 37 to be lowered to such an extent that the relay winding 12 may become fully energized. In other words, the condensers 20 and 22 which are connected in an alternating current bridge circuit have their magnitudes determined and altered in accordance with the magnitude of the unidirectional component of the flame rod current. This variation in magnitude of the condensers 20 and 22 is possible because of the non-linear characteristics of such condensers, as described above; and thus, the use of non-linear condensers or equivalent means is considered essential.

It is observed that the condenser 60 which is connected in shunt with the relay winding 12 in no way affects the basic theory of operation of the circuit thus far described, its only purpose is to provide more satisfactory relay operation; and, as a matter of fact, with a suitable relay, the condenser 60 may be omitted.

Considering the arrangement of condensers 20 and 22 with resistances 19 and 21, the magnitudes of condensers 20 and 22 are substantially the same, and, likewise, the magnitudes of resistances 19 and 21 are substantially the same. Thus, these four components 19, 20, 21 and 22 are connected in a bridge which is approximately balanced. Because of this balanced arrangement, the flame rod supply circuit voltage, which includes a secondary winding 15B has a negligible effect on the circuit controlling the bias of the magnetic amplifier which includes the saturable reactors 32 and 33; and this is so even though the flame rod may become grounded.

If desired, the resistances 19 and 21 may be replaced with capacitors, and in such case the operation is the same as described above. Further, although two saturable reactors 32 and 33 are shown herein, it is evident that such two saturable reactors may be substituted by one saturable reactor having the windings 36 and 37 but only one biasing winding functioning in the same manner as the two windings 30 and 31.

The relay winding 12 is associated with the switch 12A which is closed when the relay 12 is energized. When the switch 12A is closed, indicating the presence of a flame at the pilot burner 100, the solenoid 102 is energized by source 104 to allow gas to flow to the main burner 105 which is, of course, ignited by the pilot flame.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. In a system of the character described, a bridge circuit having four arms and an output circuit across which is developed a voltage representative of the balanced condition of said bridge circuit, a source of alternating current connected to the input circuit of said bridge circuit, one of said four arms comprising two serially connected non-linear voltage responsive condensers in a first serial circuit which is shunted by a second serial circuit, said second serial circuit comprising a pair of impedances, a control device coupled to said alternating current source for developing a unidirectional voltage in response to a condition and having a pair of output terminals, one of said terminals being coupled to the junction of said impedance and the other of said terminals being coupled to the junction of said condensers, said non-linear condensers and said impedances comprising a substantially balanced bridge network with one input terminal thereof being said junction of said impedances and the other terminal thereof being said junction of said condensers, said pair of impedances having a relatively small direct current impedance which, however, is relatively high in comparison to the alternating current impedance of said condensers, said balanced bridge network serving to equalize the alternating current voltages applied to said condensers by said bridge circuit and prevent passage thereof to said control device, and a utilization device coupled to said output network.

2. In a system of the character described, a bridge circuit having four arms and an output circuit across which is developed a voltage representative of the balanced condition of said bridge circuit, one of said four arms comprising two serially connected non-linear voltage responsive condensers in a first serial circuit which is shunted by a second serial circuit, said second serial circuit comprising a pair of impedances, a control device for developing a unidirectional voltage in response to a condition and having a pair of output terminals, one of said terminals being coupled to the junction of said impedances and the other one of said terminals being coupled to the junction of said condensers, said non-linear condensers and said impedances comprising a substantially balanced bridge network with one input terminal thereof being said junction of said impedances and the other terminal thereof being said junction of said condensers, a second of said four arms comprising a condenser, the third and fourth of said four arms comprising a center-tapped transformer secondary winding, said pair of impedances having a relatively small direct current impedance which, however, is relatively high in comparison to the alternating current impedance of said condensers, said balanced bridge network serving to equalize the alternating current voltages applied to said condensers by said bridge circuit and prevent passage thereof to said control device, a saturable reactor having a control winding connected in said output circuit, said saturable reactor having a pair of windings controlled by the aforementioned winding, and a utilization device connected between the center tap of said transformer winding and the junction of said pair of said saturable reactor windings.

References Cited in the file of this patent

UNITED STATES PATENTS

| | | |
|---|---|---|
| 2,379,871 | Beam et al. | July 10, 1945 |
| 2,594,022 | Horton | Apr. 22, 1952 |
| 2,611,039 | Hepp | Sept. 16, 1952 |
| 2,632,102 | Jellinek | Mar. 17, 1953 |
| 2,640,920 | Cairns | June 2, 1953 |

FOREIGN PATENTS

| | | |
|---|---|---|
| 603,327 | Great Britain | June 14, 1948 |